(12) United States Patent
Cherkaoui et al.

(10) Patent No.: US 6,569,356 B1
(45) Date of Patent: May 27, 2003

(54) CHIRAL COMPOUNDS AND THEIR USE AS DOPING AGENTS IN LIQUID CRYSTALS

(75) Inventors: Zoubair Cherkaoui, Allschwil (CH); Klaus Schmitt, Lörrach (DE)

(73) Assignee: Rolic AG, Zug (CH)

( * ) Notice: Subject to any disclaimer, the term of this patent is extended or adjusted under 35 U.S.C. 154(b) by 0 days.

(21) Appl. No.: 09/743,139

(22) PCT Filed: Jul. 6, 1999

(86) PCT No.: PCT/IB99/01252

§ 371 (c)(1),
(2), (4) Date: Jan. 5, 2001

(87) PCT Pub. No.: WO00/02856

PCT Pub. Date: Jan. 20, 2000

(30) Foreign Application Priority Data

Jul. 8, 1998 (GB) ............................................. 9814827

(51) Int. Cl.⁷ .......................... A01N 43/36; C09K 19/52
(52) U.S. Cl. ............................. 252/299.61; 350/350 R; 350/350 S; 252/299.01
(58) Field of Search ........................ 252/299.61, 299.01; 350/350 R, 350 S; 548/533; 544/316, 318, 298, 335, 372

(56) References Cited

U.S. PATENT DOCUMENTS

| | | | |
|---|---|---|---|
| 4,299,840 A | | 11/1981 | Skinner et al. |
| 4,873,252 A | | 10/1989 | Kruger et al. |
| 4,880,827 A | * | 11/1989 | Tamoto et al. ............... 514/423 |
| 4,915,868 A | * | 4/1990 | Gunter et al. .......... 252/299.61 |
| 4,946,850 A | | 8/1990 | Kruger et al. |
| 5,158,970 A | * | 10/1992 | Shioiri et al. ............... 514/422 |
| 5,229,474 A | * | 7/1993 | Stupp .......................... 526/298 |
| 6,414,100 B1 | * | 7/2002 | Daimon et al. ............. 526/261 |

| | | |
|---|---|---|
| 2001/0002402 A1 | 5/2001 | Froelich et al. |

FOREIGN PATENT DOCUMENTS

| | | | |
|---|---|---|---|
| EP | 0 238 319 | 9/1987 | |
| EP | 0 281 908 | 9/1988 | |
| GB | 2 298 202 | 8/1996 | |
| WO | 99/65308 | * 12/1999 | .......... A01N/43/36 |

OTHER PUBLICATIONS

Derwent Abstract of EP 0 281 908, WPI Acc No 1988–258659/198837, XRAM Acc No. C88–115318.
Calmes et al., "Polyacrylic crosslinked resins with pendant chirality as auxiliary in supported asymmetric synthesis," Tetrahedron Letters, vol. 27, No. 36, pp.4303–4306 (1986).
Goldstein et al., "The First Enantioselective Total Synthesis of the Allopumiliotoxin A Alkaloids 267A and 339B," J. Org. Chem., vol. 57, pp. 1179–1190 (1992).
Kawanami et al., "Asymmetric Diels–Alder Reaction of Acrylamides Having trans–2,5–Disubstituted Pyrrollidines as Chiral Auxiliaries," Bull. Chem Soc. Jpn. vol. 60, pp. 4190–4192 (1987).
Feng et al., "Study on Nonlinear Optical Active NPP and PNP Acrylate Copolymers," Synthetic Metals, 55–57, 3945–3950 (1983).
XP–002081591, "Vinyl ether useful function macromolecular compound preparation condensation dehydrate protect proline vinyloxy alkyl alcohol," (Feb. 4, 1997).

* cited by examiner

*Primary Examiner*—Mark F. Huff
*Assistant Examiner*—Jennifer R. Sadula
(74) *Attorney, Agent, or Firm*—Finnegan, Henderson, Farabow, Garrett & Dunner, L.L.P.

(57) ABSTRACT

Chiral prolinol derivatives of formula (1). The compounds may be used as doping agents for liquid crystals for a wide range of applications, including solid state cholesteric filters for projection displays, circular polarizers and optical filters.

23 Claims, No Drawings

CHIRAL COMPOUNDS AND THEIR USE AS DOPING AGENTS IN LIQUID CRYSTALS

This invention relates to chiral materials and their use as doping, agents for liquid crystals for a wide range of applications including solid state cholesteric filters for projection displays, circular polariser, optical filter. etc.

The addition of a chiral compound to an achiral liquid crystalline phase is one of the procedures currently used for the conversion of achiral into chiral mesophases. The nematic phase, for example, is converted to the cholesteric one when being doped with a small amount of a chiral substance. This conversion manifests itself by the occurrence of an intermolecular helix which is characterised by the-so-called helical twisting power (HTP) given in Equation 1.

$$HTP = \left[\frac{dp^{-1}}{dx}\right]_{X=0} \cong \frac{p^{-1}}{x} = \sum_i x_i (HTP)_i \quad (1)$$

$HTP$ (μm$^{-1}$)    helical twisting power for small concentrations $p$ (μm)    pitch of induced helix, + for (P)-, − for (M)-helix $x$    mole fraction of the dopant $\sum_i$    sum over all chiral conformers of the dopant $x_i$    mole fraction of conformer $i$ Said HTP is in fact a measure for the efficiency of a given dopant and is determined by the Cano method with solutions of the dopant in the host mesophase. Since the chiral guest and the achiral host compounds are not necessarily compatible at the molecular scale, their binary solution is frequently characterised by undesirable chances of the thermotropic sequence of the initial host liquid crystalline material, like for example a depression of the clearing point. Those changes could in turn have negative effects on the phase properties of the host, such as a decrease of the birefringence etc. Therefore, a chiral dopant is sought so that with very small concentrations of this latter, large values of HTP could be induced.

As such efficient chiral dopants there are the binaphthol derivatives described in GB-A-2 298 202. However chiral binaphthol derivatives may undergo partial racemisation when being heated. Besides, their preparation is expensive because it includes asymmetric resolution of binaphthol racemate as a crucial reaction step.

U.S. Pat. No. 4,835,277 (Choe / Hoechst Celanese Corporation) discloses at Example 1 a polymer of $_L$-N-p-nitrophenyl-2-pyrrolidinemethyl acrylate:

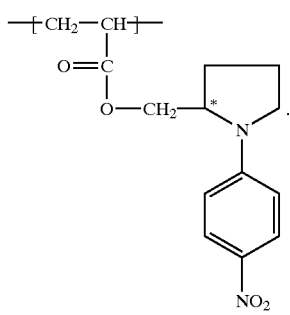

Synthetic Metals 57 (1), 1993, 3945–3950 (Feng et al.) discloses compounds of the following formula:

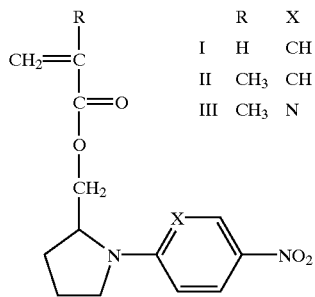

|     | R    | X  |
|-----|------|----|
| I   | H    | CH |
| II  | CH$_3$ | CH |
| III | CH$_3$ | N  |

The above two documents are in the field of polymer films showing non-linear optical properties. In unrelated fields the following may be mentioned:

- *Tet. Lett.* 27 (36), 1986, 4303–4306 (Calmes et al.) disclosing a compound of the following formula:

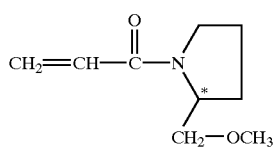

- *Bull. Chem. Soc. Jpn.* 60 (11), 1987, 4190–4192 (Kawanami et aL) disclosing what would appear to be a compound of the following formula:

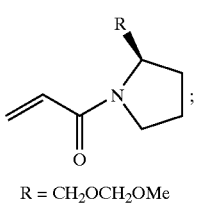

R = CH$_2$OCH$_2$OMe

- *J. Org. Chem.* 57, 1992, 1179–1190 (Goldstein et al.) disclosing a compound of the following formula, an enol ether intermediate in a route for the synthesis of amphibian alkaloids:

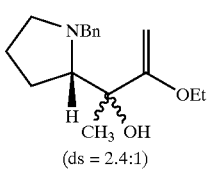

(ds = 2.4:1)

The synthesis of chiral compounds bearing a carbon atom as a single asymmetric chiral centre is generally trivial and inexpensive. Nevertheless, their use as doping agents for liquid crystals has only provided mixtures with a relatively small HTP. However, we have now discovered that a further class of compounds, including within its scope compounds that exhibit a sterically hindered single chiral centre, is efficient for producing a large HTP.

Thus the invention provides chiral prolinol derivatives of formula 1:

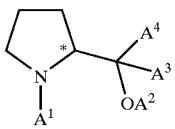

(I)

in which:

$A^1$, $A^2$ and $A^4$ each independently represents hydrogen; an optionally-substituted methyl group; an optionally-substituted aliphatic group with 2 to 80 C-atoms, in which one or more C-atoms may be replaced by a heteroatom, in such a manner that oxygen atoms are not linked directly to one another; or an optionally-substituted aromatic ring system, with 1 to 80 C-atoms; and $A^3$ represents an optionally-substituted aliphatic group with 2 to 80 C-atoms, in which one or more C-atoms may be replaced by a heteroatom, in such a manner that oxygen atoms are not linked directly to one another; or an optionally-substituted aromatic ring system, with 1 to 80 C-atoms;

wherein at least one of the $A^1$ to $A^4$ residues includes a polymerisable group, with the proviso that, when the only polymerisable group is in the $A^3$ residue, the polymerisable group does not comprise a double bond directly connected to the carbon atom linking $A^3$ and $A^4$.

The term "aliphatic" includes straight-chain and branched alkyl, as well as saturated and unsaturated groups. Possible substituents include alkyl, aryl (thus giving an araliphatic group) and cycloalkyl, as well as amino, cyano, epoxy, halogen, hydroxy, nitro, oxo etc. Possible heteroatoms which may replace carbon atoms include nitrogen, oxygen and sulphur. In the case of nitrogen further substitution is possible with groups such as alkyl, aryl and cycloalkyl.

The compounds of the invention have surprisingly been found to be efficient for producing a large HTP, even those that exhibit a single chiral centre. Of course, other chiral groups may be present elsewhere in the molecule.

The compounds of the invention may be used as doping agents for liquid crystals for a wide range of applications including solid state cholesteric filters for projection displays, circular polariser, optical filter, etc.

Note that, although one or more of $A^1$, $A^2$ and $A^4$ may independently represent hydrogen or an optionally-substituted methyl group, $A^3$ always represents a bulkier optionally-substituted aliphatic group with 2 to 80 C-atoms, in which one or more C-atoms may be replaced by a heteroatom, or an optionally-substituted aromatic ring system. Thus at least one such bulkier group is always present in the compounds of the invention. Although one or both of $A^1$ and $A^4$ may represent a small group such as hydrogen or methyl, it is preferable to have several bulky groups. Thus, preferably $A^1$, $A^3$ and $A^4$ each independently represents an optionally-substituted aliphatic group with 2 to 80 C-atoms, in which one or more C-atoms, may be replaced by a heteroatom, in such a manner that oxygen atoms are not linked directly to one another; or an optionally-substituted aromatic ring system, with 1 to 80 C-atoms.

Preferred embodiments of the invention relates to chiral prolinol derivatives of formula I. wherein:

$A^3$ and $A^4$ have each independently one of the meanings of formula II:

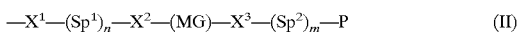

(II)

$A^2$ is a hydrogen atom or has one of the meanings of formula IIb or one of the meanings of formula IIc: and $A^1$ has one of the meanings of formula IIb or one of the meanings of formula IIc:

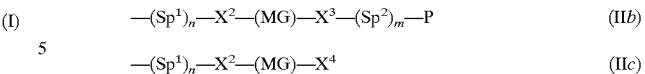

in which:

$X^1$ to $X^3$ each independently denote —O—, —S—, —NH—, —N(CH$_3$)—, —CH(OH)—, —CO—, —CH$_2$(CO)—, —SO—, —CH$_2$(SO)—, —SO$_2$—, —CH$_2$(SO$_2$)—, —COO—, —OCO—, —OCO—O—, —S—CO—, —CO—S—, —SOO—, —OSO—, —SOS—, —CH$_2$—CH$_2$—, —OCH$_2$—, —CH$_2$O—, —C(H=CH—, —C≡C— or a single bond;

$X^4$ is a halogen;

Sp$^1$ and Sp$^2$ are each independently straight or branched spacer groups having 1 to 20 C-atoms which may be unsubstituted, mono- or polysubstituted by halogen or CN, it being also possible for one or more CH$_2$ groups to be replaced, in each case independently from one another, by —O—, —S—, —NH—, —N(CH$_3$)—, —CH(OH)—, —CO—, —CH$_2$(CO)—, —SO—, —CH$_2$(SO)—, —SO$_2$—, —CH$_2$(SO$_2$)—, —COO—, —OCO—, —OCO—O—, —S—CO—, —CO—S—, —SOO—, —OSO—, —SOS—, —C≡C—, —(Si(CH$_3$)$_2$O)$_{q1}$—, —(CF$_2$)—$_r$, —(CD$_2$)$_s$— or —C(W$^1$)=C(W$^2$)—, in such a manner that oxygen atoms are not linked directly to one another, with q1, r and s in the range 1 to 15: and W$^1$ and W$^2$ each independently denote H.

H—(CH2)$_{q2}$— or Cl with q2 in the range 1 to 15:

P is a polymerisable group selected from the formulae: CH$_2$=CW—, CH$_2$=CW—COO—, CH$_2$=C(Ph)—COO—, CH$_2$=CH—COO—Ph—, CH$_2$=CW—CO—NH—, CH$_2$=C(Ph)—CONH—, CH$_2$=C(COOR$^1$)—CH$_2$—COO—, CH$_2$=CH—O—, CH$_2$=CH—OOC—, Ph—CH=CH—, CH$_3$—C=N—(CH$_2$)$_{m3}$—, HO—, HS—, HO—(CH$_2$)$_{m3}$—, HS—(CH$_2$)$_{m3}$—, HO(CH$_2$)$_{m3}$COO—, HS(CH$_2$)$_{m3}$COO—, HWN—, HOC(O)—, CH$_2$=CH—Ph—(O)$_{m4}$,

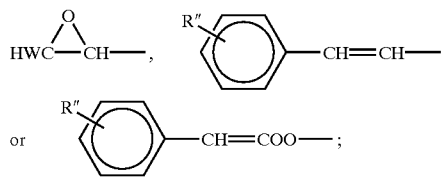

with W being H, Cl or alkyl with 1–5 C atoms, m3 being 1–9, m4 being 0 or 1, Ph being phenyl, R' being alkyl with 1–5 C atoms, R" having the meaning of R' or being methoxy, cyano or a halogen;

n and m are each independently in the range 0 to 4; with the proviso that when n is 0, then $X^1$ is a single bond; and when m is 0, then $X^3$ is a single bond; and MG is a mesogenic group comprising 1 to 4 aromatic or non-aromatic carbocyclic or heterocyclic ring systems and optionally up to 3 bridging groups and preferred are those selected each independently from the meanings of formulae III:

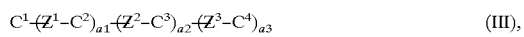

(III), in which:

$C^1$ to $C^4$ are in each case independently optionally substituted non-aromatic, aromatic, carbocyclic or heterocyclic groups, and are in preferred embodiments those selected from the formulae:

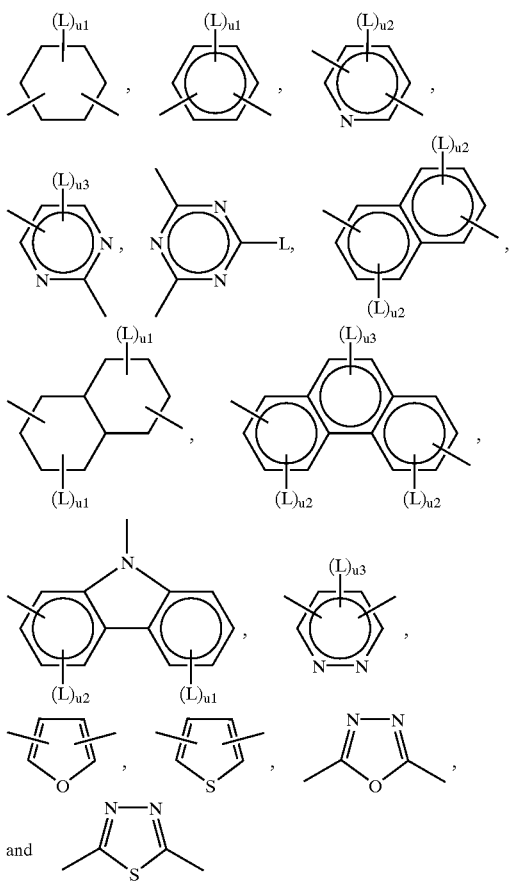

with:
L being —CH$_3$, —COCH$_3$, —NO$_2$, CN, or halogen;
u1 being 0, 1, 2, 3, or 4;
u2 being 0, 1, 2, or 3;
u3 being 0, 1, or 2:
Z$^1$ to Z$^3$ are independently from each other —COO—, —OCO—, —CH$_2$—CH$_2$—, —OCH$_2$—, —CH$_2$O—, —CH=CH—, —C≡C—, —CH=CH—COO—, —OCO—CH=CH— or a single bond; and
a1, a2 and a3 are independently integers from 0 to 3, such that a1–a2+a3≦4.

We have discovered that, to attain high values of HTP for a given guest-host liquid-crystalline system, it is desirable to increase the size and the conformational stability of the substituents around the chiral centre of the optically active host molecule. It is possible to realise such a strategy in the present invention with chiral prolinol derivatives of formula I where the two α positions could be derivatised with bulky A$^3$ and A4 substituents starting, for example, from the Grignard analogues of A$^3$ and A$^4$ of appropriate structure selected from the formula II and proline methyl ester hydrochloride, commercially available in both $_L$ and $_D$ enantiomeric forms.

The generated hydroxy group could be then derivatised, using classical synthetic methods with A$^1$ appropriately selected from the formula II*b* as organic residue, permitting the increase of solubility and/or the increase of compatibility of 1 with the guest liquid crystalline systems.

More preferred embodiments of the present invention are:
a) Chiral prolinol derivatives of formula I wherein A$^3$ and A$^4$ are identical: and b) Chiral prolinol derivatives of formula I wherein A$^2$ has one of the meanings of formula IV:

A$^3$ and A$^4$, have one of the meanings of formula V.

and A$^1$ has one of the meanings of formula Va:

in which:
Sp$^2$ is alkylene with 0 to 20 C-atoms;
P$^2$ is H, CH$_2$=CW$^5$— or CH$_2$=CW$^5$—CO—;
P$^3$ is H, CH$_2$=CW$^5$—, CH$_2$=CW$^5$—COO—, W$^5$CH=CH—O— or CH$_2$=CW$^5$—O—;
P$^4$ is CH$_2$=CW$^5$—, CH$_2$=CW$^5$—COO—, W$^5$CH=CH—O— or CH$_2$=CW$^5$—O—; with W$^5$ being H, CH$_3$, or Cl;
m4 and m5 are each independently 0 or 1 in such a manner that oxygen atoms are not linked directly to one another;
MG has the meaning given for C$^1$; and
X$^3$ is —COO—, —OCO—, —CH$_2$—CH$_2$—, —OCH$_2$—, —CH$_2$O—, —CH=CH—, —C≡C—, —CH=CH—COO—, —OCO—CH=CH— or a single bond.

Preferred compounds of formula I are those for which A$^2$ has one of the meanings of formula IV and A$^3$ and A$^4$ have one of the meanings of formula V and A$^1$ has one of the meanings of formula Va, in which:
MG is phenylene, biphenylene. naphthylene or phenanthrylene;
X$^3$ denotes —O—, —CO—, —COO—, —OCO—, —C≡C—, or a single bond, in particular, —O—, or a single bond;
Sp$^2$ is straiht-chain of formula —(CH$_2$)$_v$— with v being an integer between 0 and 20, especially preferred is ethylene, propylene. butylene, pentylene, hexylene, heptylene, octylene, nonylene, decylene, undecylene, or dodecylene;
P2 is H, CH$_2$=CW$^5$— or CH$_2$=CW$^5$—CO—;
P$^3$ is H, CH$_2$=CW$^5$—, CH$_2$=CW$^5$—COO—, W$^5$CH=CH—O— or CH$_2$=CW$^5$—O—;
P$^4$ is CH$_2$=CW$^5$—, CH$_2$=CW$^5$—COO—, W$^5$CH=CH—O— or CH$_2$=CW$^5$—O—; with W$^5$ being H, CH$_3$, or Cl; and
m4 and m5 are each independently 0 or 1 in such a manner that oxygen atoms are not linked directly to one another.

When the only polymerisable group is in the A$^3$ residue, the polymerisable group does not comprise a double bond directly connected to the carbon atom linking A$^3$ and A$^4$. However, preferred compounds of formula I are those in which, when the only polymerisable group is in either the A$^3$ or the A$^4$ residue, the polymerisable group does not comprise a double bond directly connected to the carbon atom linking A$^3$ and A$^4$.

Other aspects of the present invention are:
a) a liquid crystalline material, especially in the form of a liquid crystalline mixture. (co)polymer, elastomer, polymer gel or polymer network comprising at least two components, at least one of which is a chiral compound, characterised in that the chiral compound is a prolinol derivative of formula I;
b) a liquid crystalline material, especially in the form of a cholesteric mixture, or cholesteric polymer network, comprising at least two components, at least one of which is a chiral compound, characterised in that the chiral compound is a prolinol derivative of formula I;
c) a cholesteric polymer network obtainable by copolymerisation of an optically active polymerisable mesogenic mixture comprising:
  i) at least one chiral or/and achiral nematic polymerisable mixture chosen from the already reported broad range of chiral and achiral nematic materials, for example in *Adv. Mater.* 5, 107 (1993), *Mol. Cryst. Liq. Cryst.* 307, 111 (1997), *J. Mat. Chem.* 5, 2047 (1995) or in patent applications U.S. Pat. No. 5,593,617; U.S. Pat. No. 5,567,349; GB-A-2297556; GB-A-2299333; DE-A-19504224;

EP-A-0606940; EP-A-0643121 and EP-A-0606939, optionally selected from EP-A-0606940; EP-A-0643121 and EP-A-06069399;

ii) at least one chiral dopant of formula I;
    iii) an initiator;
    iv) optionally a non-mesogenic compound having at least one polymerisable functional group, more optionally a diacrylate compound; and
    v) optionally a stabiliser:
e) chiral polymerisable cholesteric mixtures, essentially consisting of:
    i) 70 to 99% preferably 85 to 95% by weight of at least one achiral polymerisable liquid crystal.

ii) 0.1 to 30%, preferably 1 to 15% by weight of a chiral compound of formula I;
    iii) 0.1 to 5%. preferably 0.2 to 2% by weight of a photoinitiator; and
    iv) 0 to 5%, preferably 0.1 to 1% of a stabiliser; and
f) a cholesteric film obtainable by the steps comprising ordering the above mixture in the monomeric state and in situ UV polymerisation of the resulting ordered mixture.

The inventive chiral compounds disclosed in the foregoing and the following can be prepared by methods which are known per se and which are described in standard works of organic chemistry such as, for example, Houben-Weyl, Methoden der Organischen Chenie, Thieme-Verllag, Stuttgart. In the present case of compounds I the commercially available L-proline methyl ester is used as starting material, for example according to the following reaction schemes:

(Scheme 1)

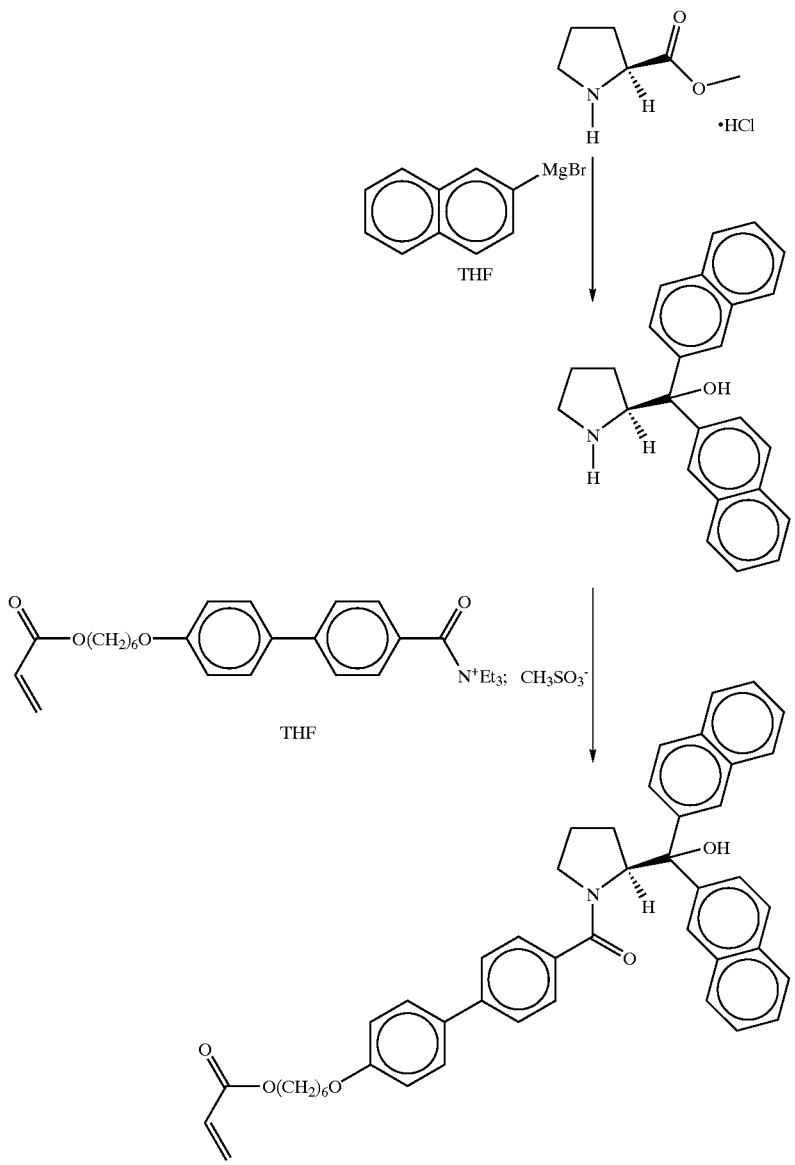

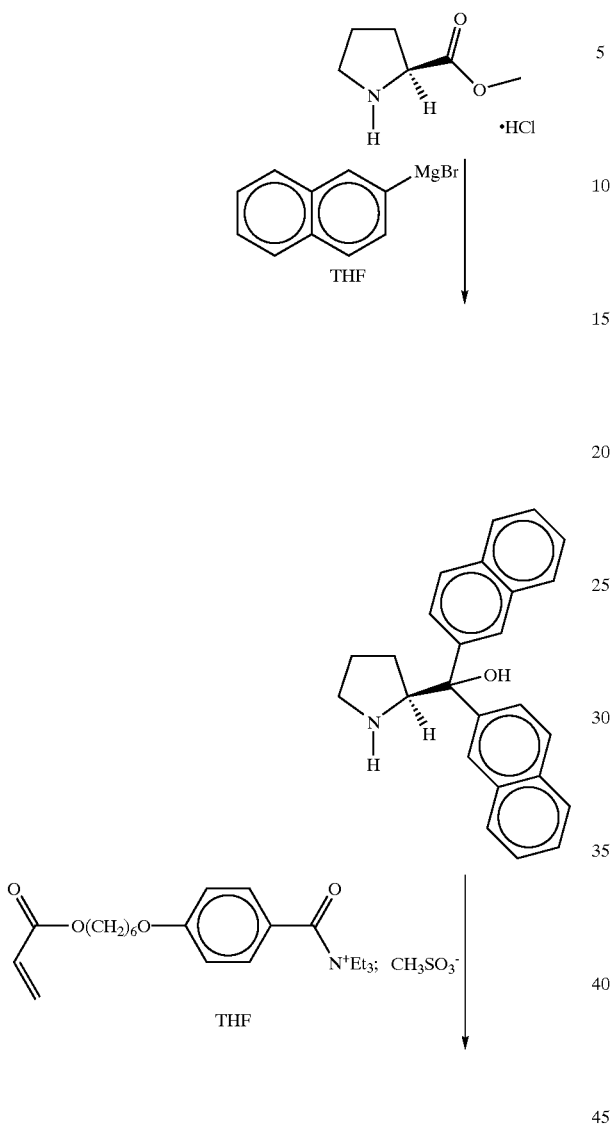
(Scheme 2)
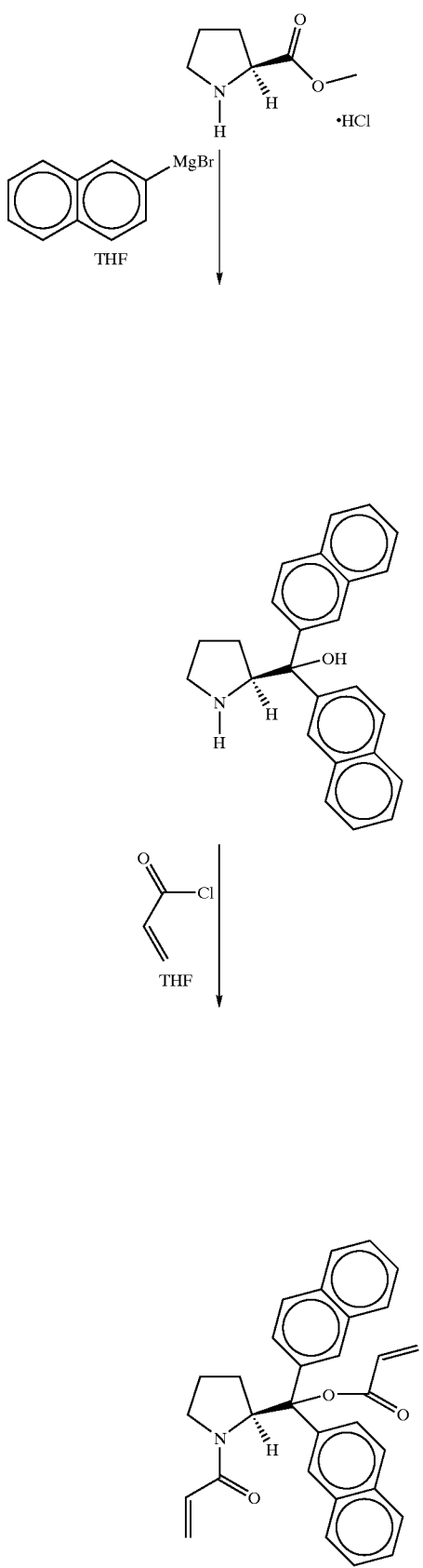
(Scheme 3)

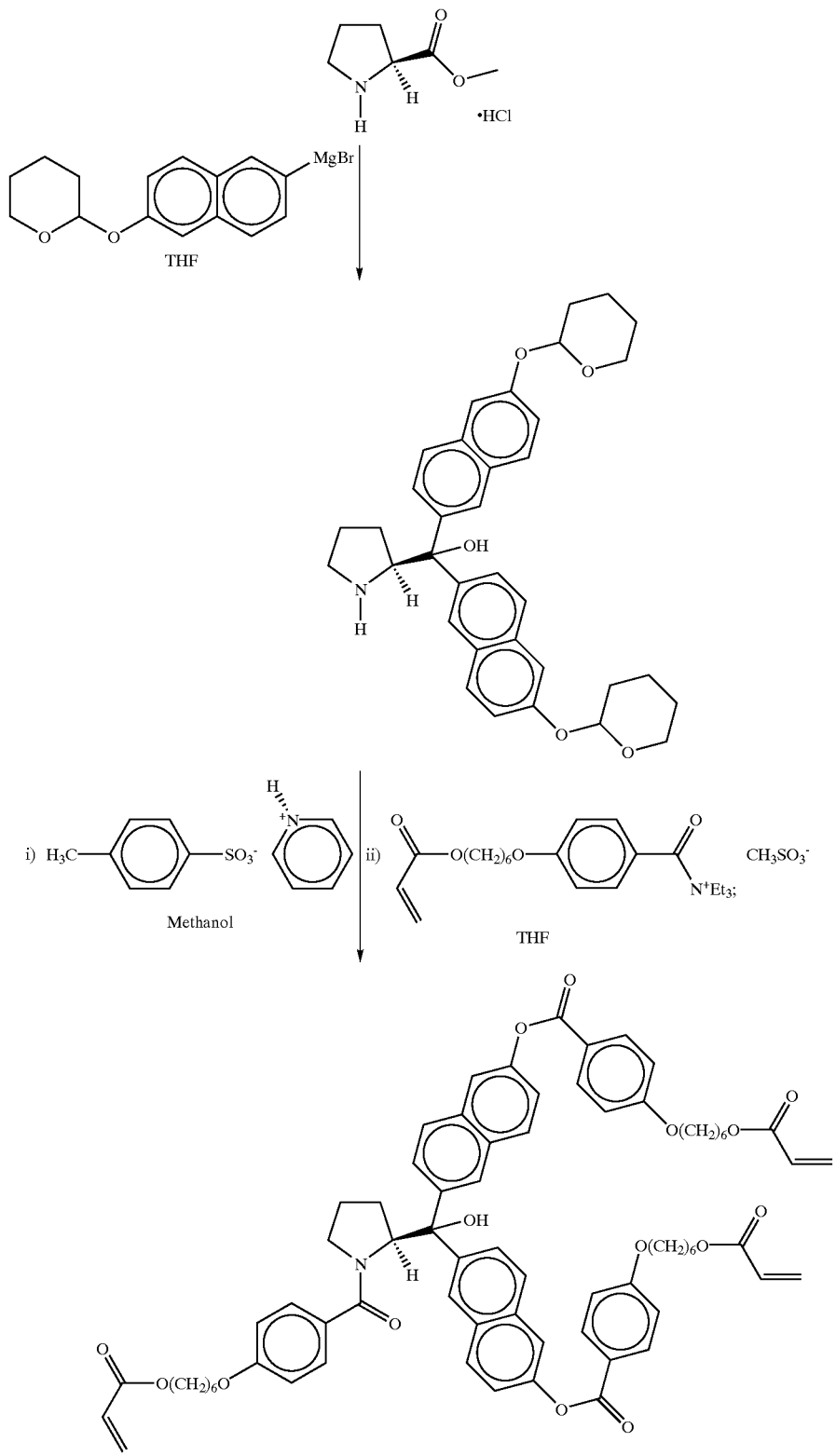
(Scheme 4)
According to the synthetic ways drawn in Schemes 1–3, typical examples representing polymerisable chiral prolinol derivatives shown in the following list of compounds may be prepared. This list is, however, to be understood only as illustrative without limiting the scope of the present invention:

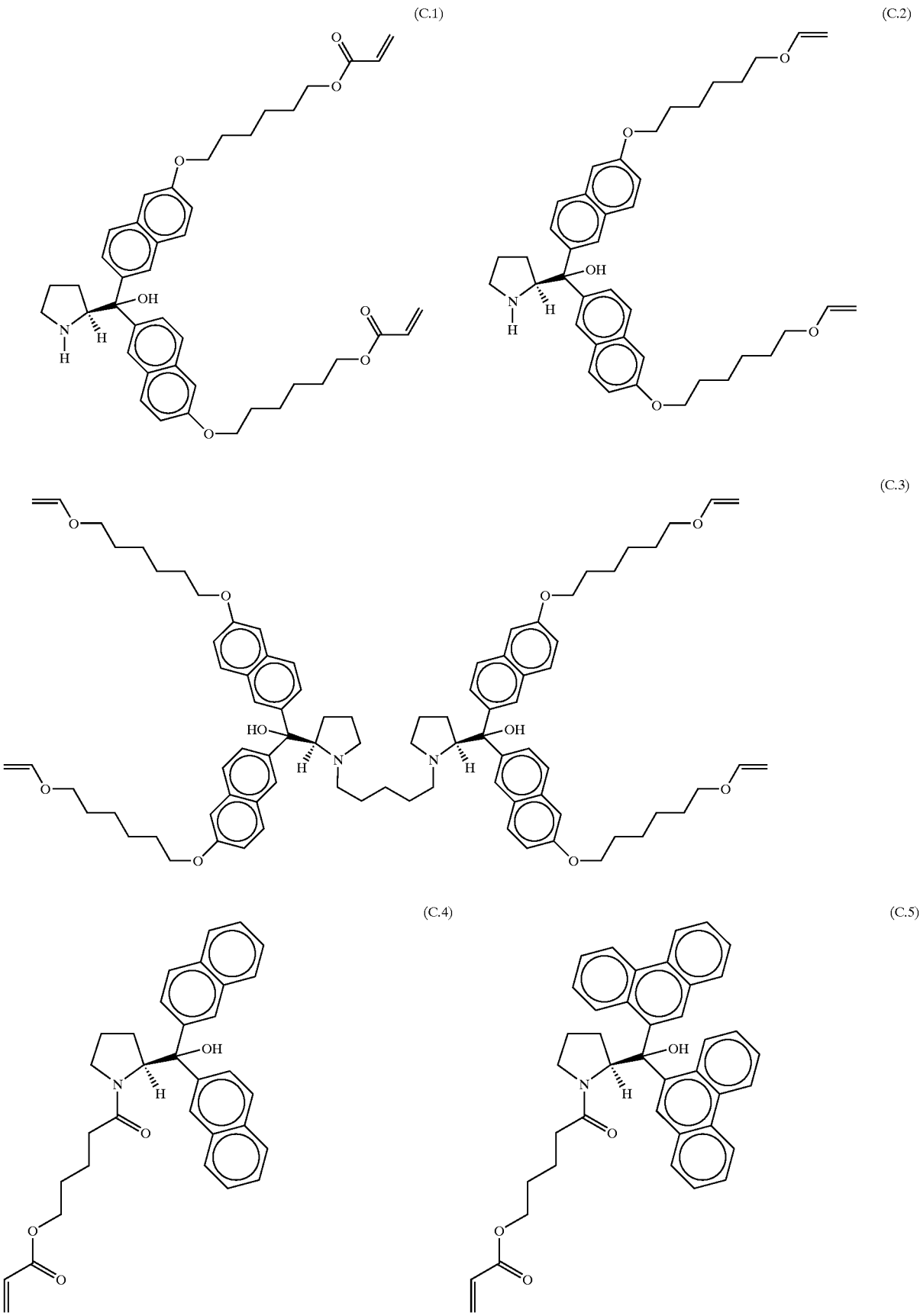

(C.6)
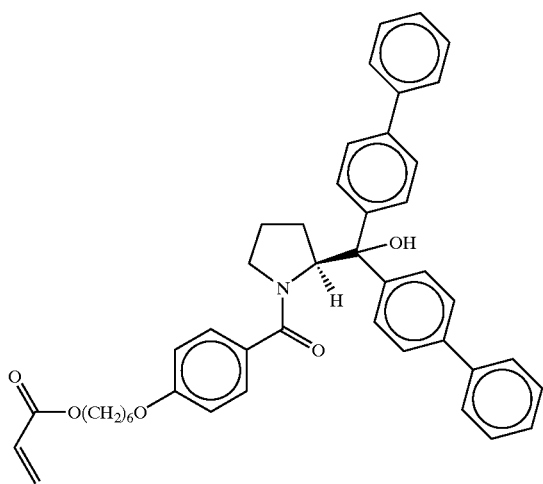
(C.7)
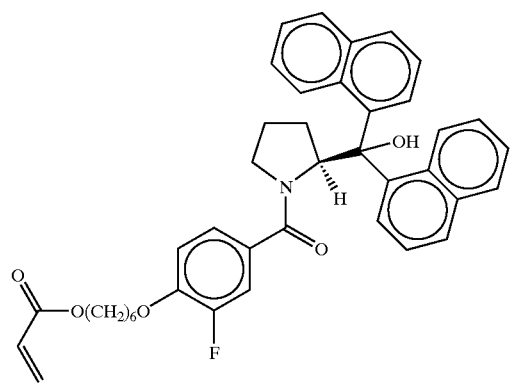
(C.8)
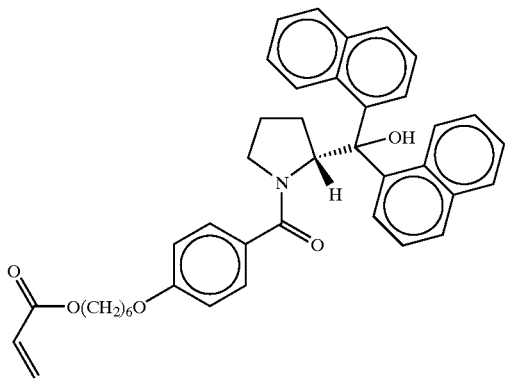
(C.9)
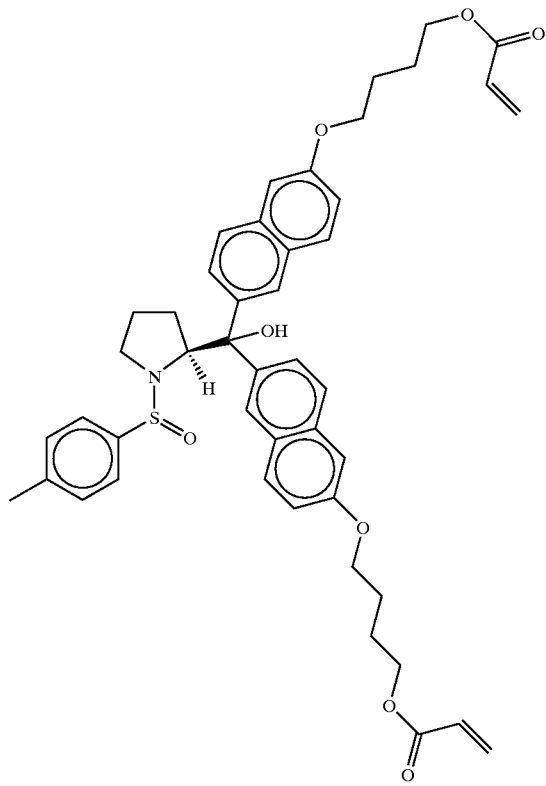

(C.10)
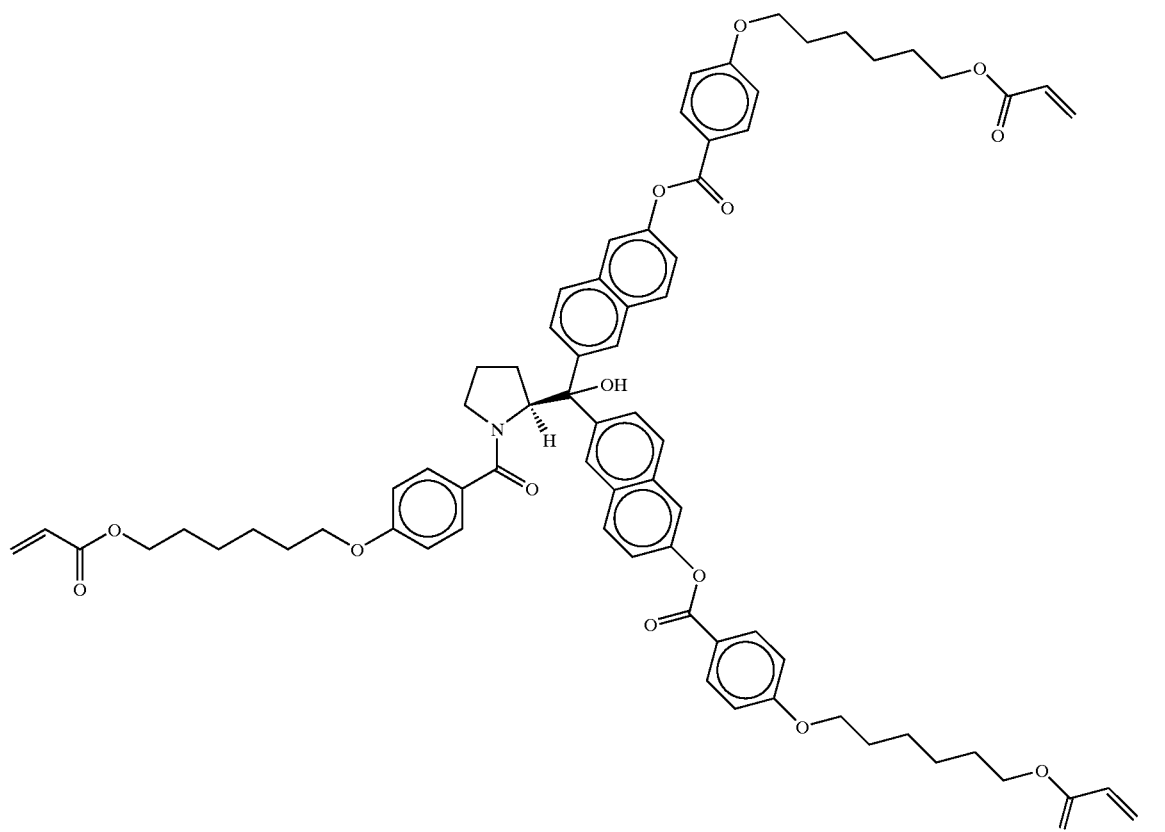
(C.11)
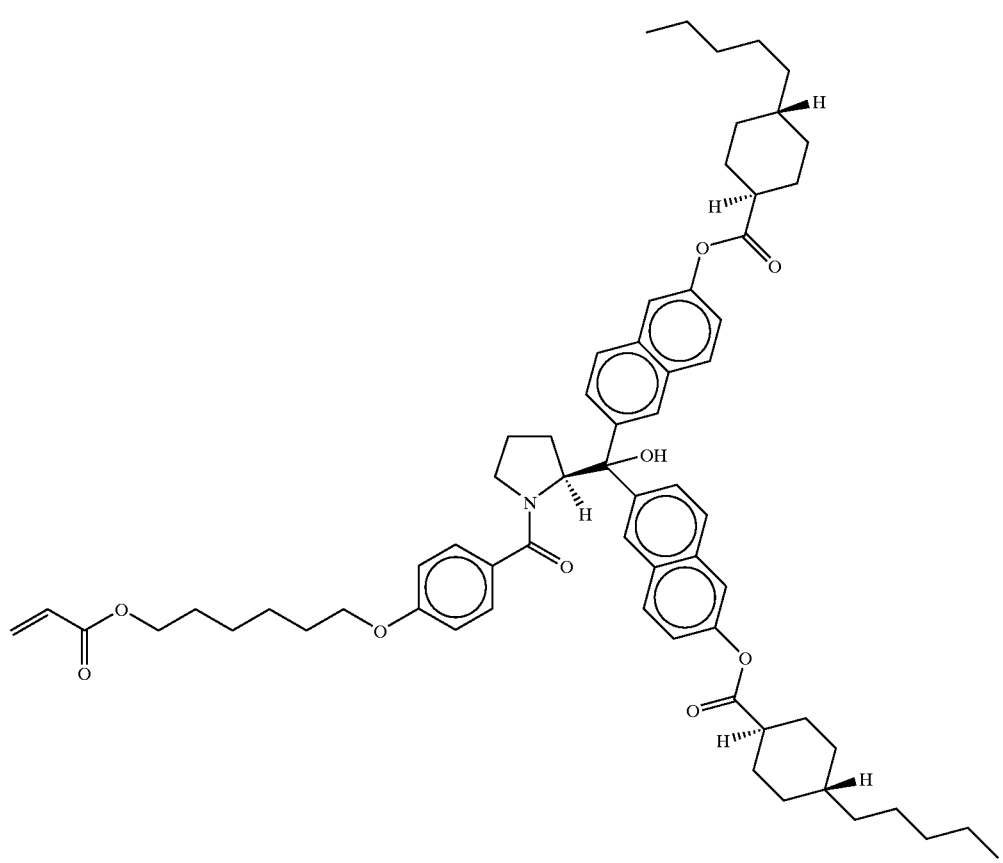

Different methods can be used for the formation of the desired cholesteric network, starting from the polymerisable coloured cholesteric mixture manufactured as described above. Preferably, transparent substrates, optionally ITO (indium tin oxide) coated, and more preferably glass or plastic substrates, were used. Said substrates carried a layer of rubbed polyimide or polyamide or a layer of coated photopolymer. Said layers are used to orient the molecular helix which forms spontaneously in the cholesteric mixture. To preclude the formation of disclinations, the polymerisable cholesteric mixture was:

- coated into a thin film, or
- provided between two of the said substrates which were sheared over a small distance until a planar order was obtained, or
- capillary filled between two of the said substrates, then subsequently cured, for example, by UV light, preferably in the presence of a photoinitiator, for example, an $I_{RGACURE}$™. Due to the strength of the three-dimensional polymer network thus formed, the film may be peeled off and used, for example, as a self-supporting cholesteric polariser.

The reflected colour from the formed cholesteric layer is dependent on the pitch length of the cholesteric helix, said pitch length being itself dependent on the concentration of the chiral dopant in, for example a nematic host. For small and high concentrations of the chiral dopant, the cholesteric network reflects red and blue colours respectively.

The novel chiral prolinol derivatives of formula I are highly suitable for producing cholesteric films which can be used in different optical and electro-optical applications.

Example 1:

Acrylic acid (S)-6-[4-[2-(hydroxydinaphthalen-2-ylmethyl)pyrrolidine-1-carbonyl]-phenoxy]hexyl ester

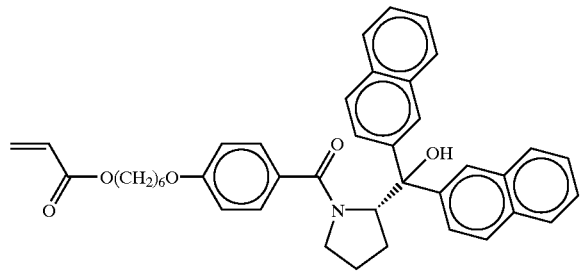

a) (S)-Dinaplihtalen-2-ylpyrrolidin-2-yl methanol

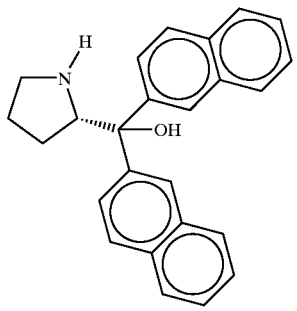

Under argon, 8.30 a of 2-bromonaphthalene are added to a suspension of magnesium (0.96 g) in 60 ml of dry THF. The obtained mixture is stirred for 2 h at room temperature (with occasional cooling within a ice bath, the reaction being exothermic). The reaction solution is then cooled at −20° C. and treated with $_L$—(—)-proline methyl ester hydrochloride (1.65 g). which is added portionwise to the reaction mixture over a period of 30 min. After complete addition, the reaction mixture is stirred at 0° C. for 75 min. then at room temperature for 4 h. Diethylamine (5.2 ml) is added dropwise to the reaction mixture followed by addition of saturated ammonium chloride solution (80 ml). The obtained mixture is then extracted with diethyl ether (2×20 ml) and the combined ether extracts are washed with saturated NaCl solution (100 ml), dried over magnesium sulphate and evaporated to dryness. The obtained residue is then purified with silica-gel column chromatography usino toluene / ethanol : 4 /1 as eluant. This affords pure (S)-dinaphthalen-2-ylpyrrolidin-2-ylmethanol as white crystalline material. Yield: 1.4 g.

b) Acrylic acid (S)-6-[4-[2-(hydroxydinaphthalen-2-ylmethyl)pyrrolidine-1-carbonyl]phenoxy]hexyl ester:

A solution of mesyl chloride (0.1 ml) in 1 ml of dry THF is added dropwise under argon over a period of 15 minutes to a cooled (−20° C.) solution of 4-(6-acryloyloxyhexyloxy) benzoic acid (0.38 g) and triethylamine (0.52 ml) in 10 ml of dry THF. The obtained reaction mixture is stirred for 60 min at −20° C. then treated with a solution of (S)-dinaphthalen-2-ylpyrrolidin-2-ylmethanol (0.46 g) in 5 ml of dry THF and further stirred at −20° C. for 2 h. The reaction mixture is then allowed to warm to room temperature, and stirring is continued overnight. The reaction mixture is then poured into 40 ml of saturated NH$_4$Cl solution and extracted with 4×40 ml of diethyl ether and 20 ml of dichloromethane. The combined organic extracts are washed with saturated NaCl solution (2×80 ml), dried over MgSO$_4$, filtered and evaporated to give a brownish residue. This was purified by chromatography over a short silica column (CH$_2$Cl$_2$ / Et$_2$O : 19 / 1 ) to give acrylic acid (S)-6-[4-[2-(hydroxydinaphthalen-2-ylmethyl)pyrrolidine-1-carbonyl]phenoxy]hexyl ester as a white crystalline material. Yield 0.51 g.

Example 2

Acrylic acid (S)-6-[4"-[2-(hydroxydinaphthalen-2-ylmethyl)pyrrolidine-1-carbonyl]-biphenyl-4-yloxy]hexyl ester

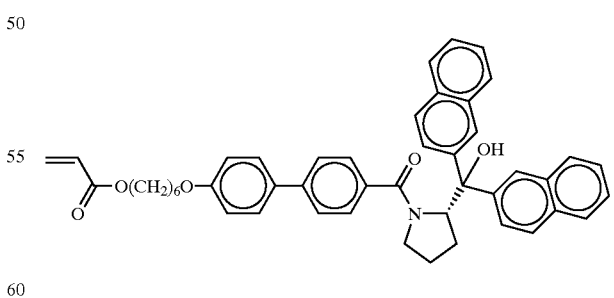

Following the procedure described in Example 1, the reaction was performed with 0.368 g of 4-(6-acryloyloxyhexyloxy)benzoic acid , 0.353 y of (S)-dinaphthalen-2-yl-prrolidin-2-ylmethanol, 0.5 ml of triethylamine and 0.11 ml of mesyl chloride affording the desired compound as white crystalline material. Yield0.43 g.

Example 3

A mixture is formulated consisting of:

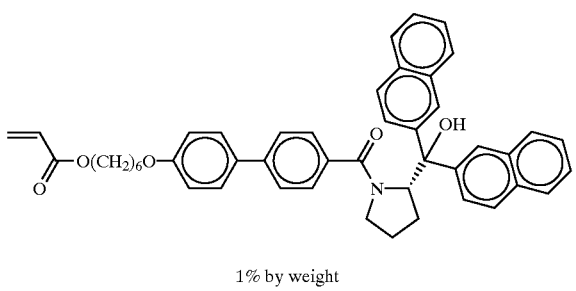

1% by weight and

ROTN 3010 99 % by weight.

The liquid crystal mixture ROTN 3010 is available from Rolic Research Ltd., Switzerland.

The mixture forms a choiesteric phase with a pitch of p=6.25 µm.

What is claimed is:

1. A chiral compound of formula I:

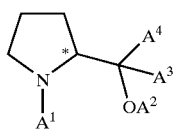

(I)

in which:

$A^1$, $A^2$ and $A^4$ each independently represents hydrogen; an optionally-substituted methyl group; an optionally-substituted aliphatic group with 2 to 80 C-atoms, in which one or more C-atoms may be replaced by a heteroatom, in such a manner that oxygen atoms are not linked directly to one another; or an optionally-substituted aromatic ring system, with 1 to 80 C-atoms; and $A^3$ represents an optionally-substituted aliphatic group with 2 to 80 C-atoms, in which one or more C-atoms may be replaced by a heteroatom, in such a manner that oxygen atoms are not linked directly to one another; or an optionally-substituted aromatic ring system, with 1 to 80 C-atoms;

wherein at least one of the $A^1$ to $A^4$ residues includes a polymerisable group, with the proviso that, when the only polymerisable group is in the $A^3$ residue, the polymerisable group does not comprise a C=C group directly connected to the carbon atom linking $A^3$ and $A^4$.

2. A chiral compound as claimed in claim 1, wherein $A^1$, $A^3$ and $A^4$ each independently represents an optionally-substituted aliphatic group with 2 to 80 C-atoms, in which one or more C-atoms may be replaced by a heteroatom in such a manner that oxygen atoms are not linked directly to one another; or an optionally-substituted aromatic ring system, with 1 to 80 C-atoms.

3. A chiral compound as claimed in claim 1, wherein:

$A^3$ and $A^4$ have each independently one of the meanings of formula II:

—$X^1$—$(Sp^1)_n$—$X_2$—(MG)—$X^3$—$(Sp^2)_m$—P    (II)

$A^2$ is a hydrogen atom or has one of the meanings of formula IIb or one of the meanings of formula IIc; and $A^1$ has one of the meanings of formula IIb or one of the meanings of formula IIc:

—$(Sp^1)_n$—$X^2$—(MG)—$X^3$—$(Sp^2)_m$—P    (IIb)

—$(Sp^1)_n$—$X^2$—(MG)—$X^4$    (IIc)

in which:

$X^1$ to $X^3$ each independently denote —O—, —S—, —NH—, —N(CH$_3$)—, —CH(OH)—, —CO—, —CH$_2$(CO)—, —SO—, —CH$_2$(SO)—, —SO$_2$—, —CH$_2$(SO$_2$)—, —COO—, —OCO—, —OCO—O—, —S—CO—, —CO—S—, —SOO—, —OSO—, —SOS—, —CH$_2$—CH$_2$—, —OCH$_2$—, —CH$_2$O—, —C(H=CH—, —C≡C— or a single bond;

$X^4$ is a halogen;

$Sp^1$ and $Sp^2$ are each independently straight or branched spacer groups having 1 to 20 C-atoms which may be unsubstituted, mono- or polysubstituted by halogen or CN, it being also possible for one or more CH$_2$ groups to be replaced, in each case independently from one another, by —O—, —S—, —NH—, —N(CH$_3$)—, —CH(OH)—, —CO—, —CH$_2$(CO)—, —SO—, —CH$_2$(SO)—, —SO$_2$—, —CH$_2$(SO$_2$)—, —COO—, —OCO—, —OCO—O—, —S—CO—, —CO—S—, —SOO—, —OSO—, —SOS—, —C≡C—, —(Si(CH$_3$)$_2$O)$_{q1}$—, —(CF$_2$)$_r$—, —(CD$_2$)$_s$— or —C(W$^1$)=C(W$^2$)—, in such a manner that oxygen atoms are not linked directly to one another, with q1, r and s in the range 1 to 15; and $W^1$ and $W^2$ each independently denote H, H—(CH2)$_{q2}$— or Cl with q2 in the range 1 to 15;

P is a polymerisable group selected from the formulae: CH$_2$=CW—, CH$_2$=CW—COO—, CH$_2$=C(Ph)—COO—, CH$_2$=CH—COO—Ph—, CH$_2$=CW—CO—NH—, CH$_2$=C(Ph)—CONH—, CH$_2$=C(COOR')—CH$_2$—COO—, CH$_2$=CH—O—, CH$_2$=CH—OOC—, Ph—CH=CH—, CH$_3$—C=N—(CH$_2$)$_{m3}$—, HO—, HS—, HO—(CH$_2$)$_{m3}$—, HS—(CH$_2$)$_{m3}$, HO(CH$_2$)$_{m3}$COO—, HS(CH$_2$)$_{m3}$COO—, HWN—, HOC(O)—, CH$_2$=CH—Ph—(O)$_{m4}$,

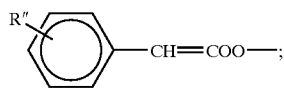

with W being H, Cl or alkyl with 1–5 C atoms, m3 being 1–9, m4 being 0 or 1, Ph being phenyl, R' being alkyl with 1–5 C atoms, R" having the meaning of R' or being methoxy, cyano or a halogen;

n and m are each independently in the range 0 to 4; with the proviso that when n is 0, then $X^1$ is a single bond; and when m is 0, then $X^3$ is a single bond;

MG is a mesogenic group comprising 1 to 4 aromatic or non-aromatic carbocyclic or heterocyclic ring systems and optionally up to 3 bridging groups.

4. A chiral compound as claimed in claim 3, wherein each MG is selected independently from the meanings of formulae III:

$$C^1-(Z^1-C^2)_{a1}-(Z^2-C^3)_{a2}-(Z^3-C^4)_{a3} \qquad (III),$$

in which:
$C^1$ to $C^4$ are in each case independently optionally substituted non-aromatic, aromatic, carbocyclic or heterocyclic groups.
$Z^1$ to $Z^3$ are independently from each other —COO—, —OCO—, —CH$_2$—CH$_2$—, —OCH$_2$—, —CH$_2$O—, —CH=CH—, —C≡C—, —CH=CH—COO—, —OCO—CH=CH— or a single bond; and
a1, a2 and a3 are independently integers from 0 to 3, such that a1+a2+a3≦4.

5. A chiral compound as claimed in claim 4, wherein $C^1$ to $C^4$ are selected from the formulae:

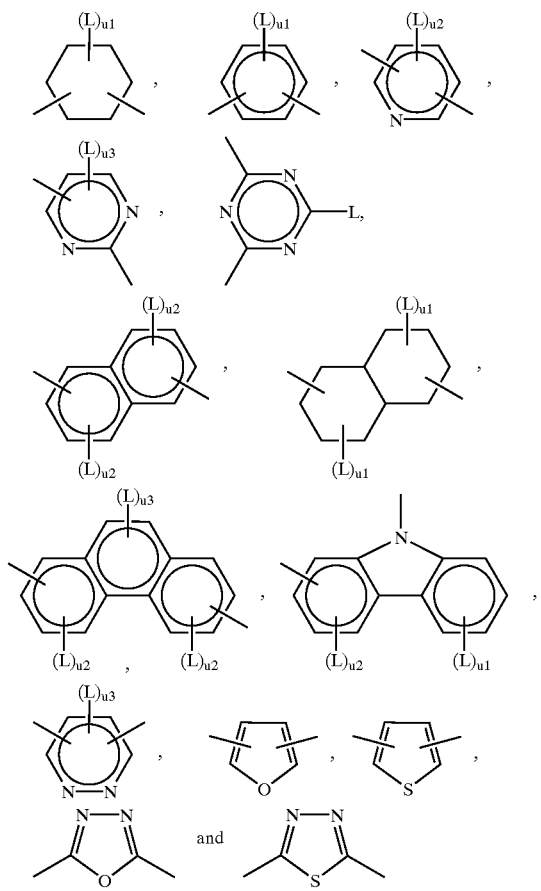

with:
L being —CH$_3$, —COCH$_3$, —NO$_2$, CN, or halogen;
u1 being 0, 1, 2, 3 or 4;
u2 being 0, 1, 2, or 3; and
u3 being 0, 1, or 2.

6. A compound as claimed in claim 3, wherein is a polymerisable group selected from the formulae: CH$_2$=CW—, CH$_2$=CW—COO—, CH$_2$=C(Ph)—COO—, CH$_2$=CH—COO—Ph—,
CH$_2$=CW—CO—NH—, CH$_2$=C(Ph)—CONH—, CH$_2$=C(COOR')—CH$_2$—COO—, CH$_2$=CH—O—, CH$_2$=CH—OOC—, Ph—CH=CH—, CH$_3$—C=N—(CH$_2$)$_{m3}$—,
CH$_2$=CH—Ph—(O)$_{m4}$,

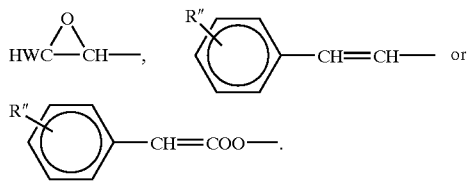

7. A chiral compound as claimed in claim 1, wherein $A^2$ has one of the meanings of formula IV:

$$(Sp^2)_{m4}-(O)_{m5}-P^2 \qquad (IV).$$

$A^3$ and $A^4$ have one of the meanings of formula V:

$$-MG-X^3-(SP^2)_{m4}-P^3 \qquad (V),$$

and $A^1$ has one of the meanings of formula Va:

$$-MG-X^3-(SP^2)_{m4}-P^4 \qquad (Va),$$

in which:
Sp$^2$ is alkylene with 0 to 20 C-atoms:
P$^2$ is H, CH$_2$=CW$^5$— or CH$_2$=CW$^5$—CO—;
P$^3$ is H, CH$_2$=CW$^5$—, CH$_2$=CW$^5$—COO, W$^5$CH=CH—O— or CH$_2$=CW$^5$—O—;
P$^4$ CH$_2$=CW$^5$—, CH$_2$=CW$^5$—COO, W$^5$CH=CH—O— or CH$_2$=CW$^5$—O—;
with W$^5$ being H, CH$_3$, or Cl;
m4 and m5 are each independently 0 or 1 in such a manner that oxygen atoms are not linked directly to one another;
MG is an optionally substituted non-aromatic, aromatic, carbocyclic or heterocyclic group; and
X$^3$ is —O—, —CO—, —COO—, —OCO, —CH$_2$—CH$_2$—, —OCH$_2$—, —CH$_2$O—, —CH=CH—, —C≡C, —CH=CH—COO—, —OCO—CH=CH— or a single bond.

8. A chiral compound as claimed in claim 7, wherein:
MG is phenylene, biphenylene, naphenylene, or phenanthrylene;
X$^3$ denotes —O—, —CO—, —COO—, —OCO—, —C≡C—, or a single bond,
Sp$^2$ is straight-chlain of formula —(CH$_2$)$_v$— with v being an integer between 0 and 20.
P$^2$ is H, CH$_2$=CW$^5$— or CH$_2$=CW$^5$—CO—;
P$^3$ is H, CH$_2$=CW$^5$—, CH$_2$=CW$^5$—COO—, W$^5$CH=CH—O— or CH$_2$=CW$^5$—O—;
P$^4$ is CH$_2$=CW$^5$—, CH$_2$=CW$^5$—COO—, W$^5$CH=CH—O— or CH$_2$=CW$^5$—O—;
with W$^5$ being H, CH3, or Cl; and
m4 and m5 are each independently 0 or 1 in such a manner that oxygen atoms are not linked directly to one another.

9. A chiral compound as claimed in claim 8, wherein Sp$^2$ is ethylene, propylene, butylene, pentylene, hexylene, heptylene, octylene, nonylene, decylene, undecylene, or dodecylene.

10. A chiral compound as claimed in claim 8, wherein X$^3$ denotes —O—, or a single bond.

11. A chiral compound as claimed in claim 1, wherein, when the only polymerisable group is in either the A$^3$ or the $A^4$ residue, the polymerisable group does not comprise a C=C group directly connected to the carbon atom linking $A^3$ and $A^4$.

12. A chiral compound as claimed in claim 1, wherein $A^3$ and $A^4$ are identical.

13. A liquid crystalline mixture comprising at least one chiral compound of formula I according to claim 1.

14. A liquid crystalline mixture as claimed in claim 13, consisting essentially of:

i) at least one polymerisable non-optically-active liquid crystal, ii) a chiral compound of formula I, iii) a photoinitiator, and iv) a stabiliser.

15. A process for making an optically-active liquid crystalline film, which comprises ordering the mixture as claimed in claim 14 in the monomeric state, and in situ UV polymerizing the ordered mixture.

16. An optically-active liquid crystalline film made by the process of claim 15.

17. An optically-active liquid crystalline film as claimed in claim 16, which is capable of selectively reflecting light of visible wavelengths.

18. A method for polarizing light, which comprises passing the light through an optically-active liquid crystalline film as claimed in claim 16.

19. A method for converting a liquid crystalline nematic phase to the cholesteric phase, which comprises adding to the liquid crystalline nematic phase an effective amount of a chiral compound as claimed in claim 1.

20. A method for doping a liquid crystal, which comprises adding to the liquid crystal an effective amount of a chiral compound as claimed in claim 1.

21. A chiral compound as claimed in claim 1, wherein optionally-substituted means unsubstituted or substituted with alkyl, aryl, cycloalkyl, amino, cyano, epoxy, halogen, hydroxy, nitro, or oxo.

22. A chiral compound as claimed in claim 1, wherein heteroatom means nitrogen, oxygen, or sulphur.

23. A chiral compound as claimed in claim 1, wherein optionally-substituted means unsubstituted or substituted with alkyl, aryl, cycloalkyl, amino, cyano, epoxy, halogen, hydroxy, nitro, or oxo; and wherein heteroatom means nitrogen, oxygen, or sulphur.

* * * * *

UNITED STATES PATENT AND TRADEMARK OFFICE
CERTIFICATE OF CORRECTION

PATENT NO.    : 6,569,356 B1
DATED         : May 27, 2003
INVENTOR(S)   : Zoubair Cherkaoui et al.

It is certified that error appears in the above-identified patent and that said Letters Patent is hereby corrected as shown below:

<u>Column 21,</u>
Line 34, "$A^4$each" should read -- $A^4$ each --.
Line 64, "-$X^1$-($Sp^1$)$_n$-$X_2$-(MG)-$X^3$-($Sp^2$)$_m$-P" should read
-- -$X^1$-($Sp^1$)$_n$-$X^2$-(MG)-$X^3$-($Sp^2$)$_m$-P --.

<u>Column 23,</u>
Line 61, "wherein is" should read -- wherein P is --.

<u>Column 24,</u>
Line 20, "-MG-$X^3$-($SP^2$)$_{m4}$-$P^3$" should read -- -MG-$X^3$-($Sp^2$)$_{m4}$-$P^3$ --.
Line 24, "-MG-$X^3$-($SP^2$)$_{m4}$-$P^4$" should read -- -MG-$X^3$-($Sp^2$)$_{m4}$-$P^4$ --.
Line 44, "naphenylene" should read -- naphthylene --.
Line 49, "straight-clhain" should read -- straight-chain --.

Signed and Sealed this

Eleventh Day of November, 2003

JAMES E. ROGAN
*Director of the United States Patent and Trademark Office*